(12) United States Patent
Albl et al.

(10) Patent No.: US 12,011,950 B2
(45) Date of Patent: Jun. 18, 2024

(54) WHEEL BEARING ARRANGEMENT FOR A MOTOR VEHICLE

(71) Applicant: AUDI AG, Ingolstadt (DE)

(72) Inventors: Johannes Albl, Ingolstadt (DE); Michael Frisch, Schönberg (DE)

(73) Assignee: AUDI AG, Ingolstadt (DE)

( * ) Notice: Subject to any disclaimer, the term of this patent is extended or adjusted under 35 U.S.C. 154(b) by 251 days.

(21) Appl. No.: 17/604,878

(22) PCT Filed: Apr. 8, 2020

(86) PCT No.: PCT/EP2020/060055
§ 371 (c)(1),
(2) Date: Oct. 19, 2021

(87) PCT Pub. No.: WO2020/216623
PCT Pub. Date: Oct. 29, 2020

(65) Prior Publication Data
US 2022/0212495 A1     Jul. 7, 2022

(30) Foreign Application Priority Data

Apr. 23, 2019   (DE) ..................... 10 2019 205 782.9

(51) Int. Cl.
| | |
|---|---|
| *F16C 19/18* | (2006.01) |
| *B60B 27/00* | (2006.01) |
| *B60B 27/02* | (2006.01) |

(52) U.S. Cl.
CPC ...... *B60B 27/0005* (2013.01); *B60B 27/0052* (2013.01); *B60B 27/0073* (2013.01);
(Continued)

(58) Field of Classification Search
CPC ............ B60B 27/0005; B60B 27/0052; B60B 27/0073; B60B 27/02; F16C 19/183; F16C 19/186; F16C 2326/02
See application file for complete search history.

(56) References Cited

U.S. PATENT DOCUMENTS

| | | | | |
|---|---|---|---|---|
| 4,010,986 A | * | 3/1977 | Otto | ....................... B60K 17/30 |
| | | | | 301/6.8 |
| 10,087,988 B2 | * | 10/2018 | Umekida | ............ B60B 27/0094 |

(Continued)

FOREIGN PATENT DOCUMENTS

| | | |
|---|---|---|
| DE | 102006029604 A1 | 12/2007 |
| EP | 3351403 A1 | 7/2018 |

(Continued)

OTHER PUBLICATIONS

International Search Report dated Oct. 6, 2020, in connection with corresponding International application No. PCT/EP2020/060055 (8pp., including machine-generated English translation).

(Continued)

*Primary Examiner* — Phillip A Johnson
(74) *Attorney, Agent, or Firm* — Maier & Maier, PLLC

(57) ABSTRACT

A wheel bearing arrangement for a motor vehicle, having a wheel hub and a wheel bearing for rotatably mounting the wheel hub on a wheel carrier. The wheel bearing has an outer ring and an inner ring. A wheel flange extends from the wheel hub in a radial direction and has a brake disc receptacle which is open in the direction facing away from the outer ring and is formed by a recess in the wheel flange and has a brake disc bearing face for a brake disc. A seal-receptacle space is formed in the wheel flange on its side facing the outer ring in an axial direction, in which seal-receptacle space there is a wheel bearing seal. A rim-centering seat element extends from the wheel hub and runs in the direction opposite the brake disc bearing face with respect to the brake disc receptacle.

14 Claims, 2 Drawing Sheets

(52) U.S. Cl.
CPC ............. *B60B 27/02* (2013.01); *F16C 19/183* (2013.01); *F16C 2326/02* (2013.01)

(56) References Cited

U.S. PATENT DOCUMENTS

| | | |
|---|---|---|
| 2012/0319460 A1 | 12/2012 | Straitiff |
| 2018/0195552 A1 | 7/2018 | Albl et al. |
| 2018/0264879 A1* | 9/2018 | Albl ...................... F16C 33/586 |
| 2021/0164519 A1* | 6/2021 | Niebling et al. ....... F16J 15/447 |

FOREIGN PATENT DOCUMENTS

| | | | |
|---|---|---|---|
| EP | 3447321 A1 | 2/2019 | |
| FR | 2689061 A1 | 10/1993 | |
| FR | 2928298 A1 | 9/2009 | |
| JP | 2002187406 A * | 7/2002 | ............ F16C 19/386 |
| WO | 2020149680 A1 | 7/2020 | |

OTHER PUBLICATIONS

Notification of Transmittal of Translation of the International Preliminary Report on Patentability dated Nov. 4, 2021, in connection with corresponding International application No. PCT/EP2020/060055; 10 pages.

Office Action issued Dec. 21, 2023, in corresponding Chinese Application No. 202080030960.6, 12 pages.

\* cited by examiner

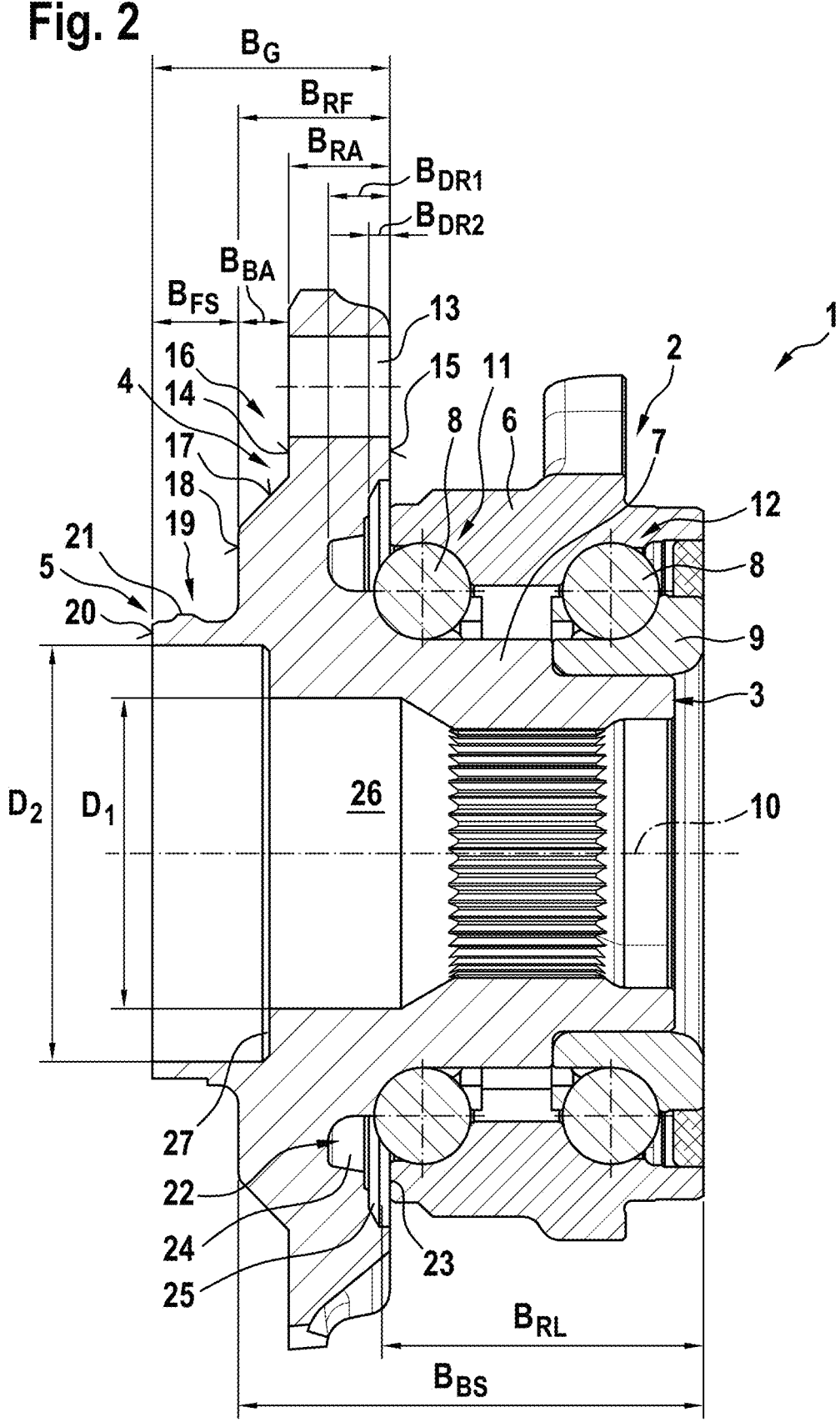

WHEEL BEARING ARRANGEMENT FOR A MOTOR VEHICLE

FIELD

The invention relates to a wheel bearing arrangement for a motor vehicle, having a wheel hub and a wheel bearing for rotatably mounting the wheel hub on a wheel carrier, wherein the wheel bearing has an outer ring and an inner ring which can rotate with respect to the outer ring about a rotational axis, which inner ring is connected to the wheel hub, wherein a wheel flange extends from the wheel hub in a radial direction and has a brake disc receptacle which, when viewed in the axial direction, is open in the direction facing away from the outer ring and is formed, when viewed in longitudinal section, by a recess in the wheel flange and has a brake disc bearing face for a brake disc, wherein a seal-receptacle space is formed in the wheel flange on its side facing the outer ring in an axial direction, in which seal-receptacle space there is a wheel bearing seal.

BACKGROUND

For example, document EP 3 351 403 A1 is known from the prior art. This describes a wheel bearing for a motor vehicle which has an outer ring, an inner ring arranged at least partially inside the outer ring, and a longitudinal axis extending in the axial direction of the outer ring and the inner ring from a vehicle inside to a vehicle outside. The inner ring has a flange section on its end facing the vehicle outer side, having a first section spaced apart farthest from an axial center of the outer ring and having a second section which forms a bearing face for attaching a brake disc. The flange section is formed stepped in such a way that the bearing face for attaching the brake disc is arranged offset toward the vehicle inside in the axial direction in relation to the section of the flange section spaced apart farthest from the axial center of the outer ring, and that a circumferential projection is located at least in regions on the side opposite to the bearing face for attaching the brake disc.

Furthermore, document EP 3 447 321 A1 describes a wheel bearing arrangement for a motor vehicle having a wheel hub and a wheel bearing for rotatably mounting the wheel hub on a wheel carrier, wherein the wheel bearing has an outer ring and an inner ring which can rotate with respect to the outer ring about a rotational axis, which inner ring is connected to the wheel hub, wherein a wheel flange extends from the wheel hub and has a brake disc receptacle which, when viewed in the axial direction, is open in the direction facing away from the outer ring and is formed, when viewed in longitudinal section, by a recess in the wheel flange and has a brake disc bearing face for a brake disc. A propeller shaft flange is fastened on the wheel hub. A seal-receptacle space is formed in the wheel flange on its side facing the outer ring.

SUMMARY

It is the object of the invention to propose a wheel bearing arrangement for a motor vehicle which has advantages over known wheel bearing arrangements, in particular enables faster and more precise mounting of the wheel on the wheel flange.

This object is achieved according to the invention by a wheel bearing arrangement for a motor vehicle having. It is provided here that a rim-centering seat element extends from the wheel hub and runs in the direction opposite the brake disc bearing face with respect to the brake disc receptacle.

The wheel bearing arrangement is used for rotatably mounting at least one wheel on a body of the motor vehicle. The wheel bearing arrangement is preferably part of a wheel suspension which is used for the suspension, in particular the sprung suspension, of the wheel with respect to the body. The wheel is rotatably mounted on the wheel carrier of the wheel bearing arrangement. For this purpose, the wheel is fastenable on the wheel flange, which is connected to the wheel hub, which is finally rotatably mounted by means of the wheel bearing on the wheel carrier. The wheel bearing has the inner ring and the outer ring. It is preferably provided as a roller bearing, in particular as a single-row or multirow roller bearing, so that roller bodies are arranged between the inner ring and the outer ring to reduce friction, which roller bodies are provided in only one or—alternatively—multiple rows.

The outer ring is fastened or fastenable on the wheel carrier, while the inner ring is connected or connectable to the wheel hub and thus the wheel flange. The inner ring can be formed in one piece and/or of the same material with the wheel hub and/or the wheel flange and can thus be integrated therein. Of course, multiple inner rings can also be provided, wherein one or more of these inner rings can be embodied separately from the wheel hub—or alternatively—in one piece and/or of the same material with the wheel hub. At least one of the inner rings, for example precisely one of the inner rings, can thus be integrated in the wheel hub and for this purpose can be formed in one piece and/or of the same material with the wheel hub, whereas another of the inner rings is formed separately from the wheel flange and is subsequently fastened thereon.

The wheel flange extends in the radial direction from the wheel hub and runs outward starting therefrom in the radial direction. In other words, this means that the wheel hub, when viewed in longitudinal section, is arranged farther inward with respect to the rotational axis than the wheel flange, which is accordingly arranged farther outward. The wheel flange is fundamentally used for fastening the wheel. The wheel flange is preferably provided and designed for a screw connection to the wheel, in particular it has at least one wheel bolt receptacle for a wheel bolt for this purpose.

After mounting of the wheel on the wheel flange, the wheel bolt engages, on the one hand, on the wheel and, on the other hand, on the wheel flange, and holds them against one another. For example, the wheel bears on a wheel bearing face of the wheel flange for this purpose and is pushed by the wheel bolt in the direction of the wheel bolt receptacle. In the axial direction, the wheel bearing face against which the wheel bears after it is mounted is spaced apart from the wheel bolt receptacle, namely by the brake disc receptacle. This means that, when viewed in longitudinal section, the brake disc receptacle is provided, when viewed in the axial direction or in longitudinal section, between the wheel bearing face and the wheel bolt receptacle.

The brake disc receptacle is used to receive a brake disc, which can be part of a brake system of the motor vehicle. The brake disc bearing face delimits the brake disc receptacle in the axial direction, so that after the brake disc is mounted, it bears, in particular bears flatly, on the wheel flange, more precisely on the brake disc bearing face in the axial direction. The brake system preferably has at least one brake shoe in addition to the brake disc, which is displaceable with respect to the brake disc and interacts with the brake disc in a braking manner in at least one position. In the at least one position, a braking force or a braking torque is thus exerted on the wheel flange by means of the brake shoe and the brake disc.

The brake disc receptacle is delimited inward in the radial direction by an outer circumferential surface of the wheel flange, which is formed by the recess of the wheel flange. The outer circumferential surface is, when viewed in longitudinal section, preferably largely or continuously planar, so that it is at least partially provided as a conical lateral surface. The outer circumferential surface can be arranged parallel with respect to the rotational axis or can be angled with respect to the longitudinal center axis. In the latter case, the outer circumferential surface is provided as an inclined surface. The outer circumferential surface preferably extends, when viewed in the axial direction, from the wheel bolt receptacle up to the wheel bearing face, against which the wheel bears after it is mounted.

The brake disc preferably has at most the same dimensions in the axial direction as the brake disc receptacle, but preferably smaller dimensions, so that it is completely received in the brake disc receptacle in the axial direction after it is mounted. In the radial direction, in contrast, the brake disc protrudes beyond the wheel flange after it is mounted, thus has a larger diameter with respect to the rotational axis than this brake disc receptacle. The wheel and/or the brake disc are each optional components of the described wheel bearing arrangement. In other words, the wheel bearing arrangement optionally comprises the wheel, but not the brake disc, or the brake disc, but not the wheel, or both the wheel and also the brake disc.

The wheel flange has, on its side facing the outer ring in the axial direction, the seal-receptacle space in which the wheel bearing seal is arranged. The wheel bearing seal bears on the wheel flange to form a seal, on the one hand, and on the outer ring to form a seal, on the other hand, so that the wheel bearing is reliably sealed off in relation to an external environment, at least from the side of the wheel flange. A further seal is preferably arranged on the side of the wheel bearing facing away from the seal in the axial direction, namely—in the case of the design of the wheel bearing as a roller bearing—on the side of the roller bodies opposite to the seal in the radial direction. The wheel bearing seal is, for example, fastened in a rotationally-fixed manner on the wheel flange and thus bears rotatably on the outer ring to form a seal. Alternatively, it is provided that the wheel bearing seal is fastened in a rotationally-fixed manner on the outer ring and thus bears rotatably on the wheel carrier to form a seal. The described design of the wheel bearing arrangement enables an extremely compact formation in the axial direction.

To enable particularly fast, simple, and precise mounting of the wheel on the wheel flange, the rim-centering seat element extends from the wheel hub. This runs in the direction opposite to the brake disc bearing face with respect to the brake disc receptacle. In other words, when viewed in longitudinal section, the brake disc receptacle is arranged in the axial direction between the rim-centering seat element and the brake disc bearing face. For example, the rim-centering seat element adjoins the wheel bearing face in the axial direction or is intersected by an imaginary plane continuously receiving the wheel bearing face in the circumferential direction with respect to the rotational axis. This means that the imaginary plane, on the one hand, continuously receives at least one region of the wheel bearing face in the circumferential direction and, on the other hand, runs through the rim-centering seat element.

The rim-centering seat element forms a rim-centering seat for the wheel or for a rim of the wheel. The rim-centering seat causes centering of the wheel with respect to the rotational axis before the wheel is fastened on the wheel flange or interacts with the wheel to center the wheel. The wheel is to be understood in the scope of this description as at least one rim of the wheel which does not necessarily have to be provided with a tire or tire equipment. However, the wheel is preferably composed of the rim and the tire or the tire equipment.

Both the wheel flange and also the rim-centering seat element thus extend from the wheel, namely the wheel flange in the radial direction and the rim-centering seat element in the axial direction. The rim-centering seat element is particularly preferably formed in one piece and/or from the same material with the wheel hub. For example, the wheel hub, the wheel flange, and the rim-centering seat element are formed in one piece and from the same material as one another, so that the wheel bearing arrangement is particularly compact and lightweight.

To form the rim-centering seat, the rim-centering seat element has, for example, a cylindrical, in particular circular-cylindrical outer circumferential surface. A radial projection can extend therefrom, which runs outward from this outer circumferential face in the radial direction. The radial projection is used to reduce a contact area between the wheel or the rim of the wheel, on the one hand, and the rim-centering seat element, on the other hand, to prevent seizing of the wheel, for example due to weather influences, corrosion, and/or jamming.

The radial projection can be formed continuously in the circumferential direction. However, segmenting of the radial direction is particularly preferred, so that the radial projection is composed of multiple radial projection segments spaced apart from one another in the circumferential direction. In the case of such a design, it can moreover be provided that the radial projection segments are present in regions of the outer circumferential surface which are on an imaginary cylinder lateral surface of a cylinder, in particular a circular cylinder, so that these regions are convex. In contrast, the outer circumferential surface can deviate from the mentioned lateral surface between the radial projection segments and can be formed concave, for example. In this way, the seizing of the wheel is avoided particularly effectively and a low weight of the wheel bearing arrangement is achieved at the same time.

One refinement of the invention provides that the seal-receptacle space, in the radial direction, overlaps an outer ring end of the outer ring facing the wheel flange. In other words, the seal-receptacle space extends farther outward in the radial direction than the outer ring end of the outer ring or even than the entire outer ring. The outer ring end is to be understood as that end of the outer ring which faces the wheel flange which is closest to the wheel flange and/or the wheel bearing face in the axial direction. Such a design of the seal-receptacle space enables the outer ring to be arranged particularly close to the wheel, for example, in such a way that the outer ring terminates flush with the wheel flange or even engages in the seal-receptacle space. A particularly compact wheel bearing arrangement in the axial direction is achieved in this way.

The outer ring end is provided, for example, on an outer ring projection which extends in the axial direction extending from a main body of the outer ring in the direction of the seal-receptacle space. The outer ring projection has smaller dimensions in the radial direction here than the outer ring as a whole, in particular at the outer ring end. The outer ring projection preferably has, on its end facing the seal-receptacle space, thus on the outer ring end, an extension in the radial direction which corresponds to at most 50%, at most 25%, or at most 10% of the greatest extension of the outer ring in the same direction.

One refinement of the invention provides that the outer ring of the wheel bearing terminates flush with a wheel flange end face of the wheel flange facing the outer ring or at least engages with an outer ring projection in the seal-receptacle space. This was already mentioned above. The wheel flange end face is to be understood as an end face of the wheel flange opposite to the wheel bearing face. When viewed in the axial direction, the wheel bearing face thus delimits the wheel flange in a first direction and the wheel flange end face delimits it in a second direction opposite to the first direction. The wheel flange end face is penetrated by the seal-receptacle space, so that the seal-receptacle space is thus present with an open edge in the wheel flange and opens via the wheel flange end face into an outer environment.

The wheel flange end face is preferably continuously located in an imaginary plane in the circumferential direction, which is particularly preferably perpendicular to the rotational axis. It can particularly preferably be provided that at least one roller body of the wheel bearing, when viewed in the axial direction, is also arranged overlapping with the wheel flange, thus in particular is arranged on a side facing the wheel bearing face of the imaginary plane preferably continuously receiving the wheel flange end face in the circumferential direction and/or is intersected by this plane.

The outer ring terminates flush with the wheel flange end face. This means that the outer ring, when viewed in the axial direction, directly adjoins the wheel flange end face. Because it is arranged here in the radial direction overlapping with the seal-receptacle space, a touch contact between the outer ring and the wheel flange is nonetheless avoided. In other words, the outer ring and the wheel flange are arranged without touching or without contact with respect to one another, although the outer ring terminates flush with the wheel flange end face. Moreover, this also applies if the outer ring or at least the outer ring projection engages in the seal-receptacle space.

The outer ring projection is to be understood—as already explained—as an extension of the outer ring which has smaller dimensions, for example, in the radial direction, than other regions of the outer ring. It can be provided, for example, that the seal-receptacle space only runs farther outward in the radial direction than the outer ring projection, but not than the entire outer ring. In other words, the seal-receptacle space only overlaps the outer ring projection in the radial direction and not the outer ring as a whole, and thus ends in the radial direction overlapping with the outer ring. Of course, however, it can also be provided that the seal-receptacle space overlaps the entire outer ring in the radial direction, thus extends farther outward in the radial direction than this outer ring. In any case, the above-mentioned outer ring is provided on the outer ring projection if it exists. The described design of the wheel bearing arrangement can be embodied extremely compactly in the axial direction.

One refinement of the invention provides that the seal-receptacle space, when viewed in longitudinal section, has a first seal-receptacle space region having a first seal-receptacle space width and a second seal-receptacle space region having a second seal-receptacle space width, which is different from the first seal-receptacle space width, wherein the first seal-receptacle space region, when viewed in the radial direction, merges into the second seal-receptacle space region overlapping with the outer ring. The seal-receptacle space can thus be divided into at least two seal-receptacle space regions, namely the first seal-receptacle space region and the second seal-receptacle space region. These differ with respect to their width, thus their extension in the axial direction, so that the first seal-receptacle space width of the first seal-receptacle space region is different from the second seal-receptacle space width of the second seal-receptacle space region.

The first seal-receptacle space region is arranged farther inward in the radial direction than the second seal-receptacle space region. In other words, the first seal-receptacle space region runs in the radial direction up to a transition point and merges at this point into the second seal-receptacle space region. The first seal-receptacle space width is preferably greater than the second seal-receptacle space width, so that the seal-receptacle space has a greater width farther inward in the radial direction than farther outward in the radial direction.

The extension of the seal-receptacle space regions in the radial direction can in principle be equal to or different from one another. Thus, for example, the first seal-receptacle space region has the same dimensions in the radial direction as the second seal-receptacle space region. The dimensions of the seal-receptacle space regions are preferably at least similar in the radial direction, so that, for example, the dimensions in the radial direction of the first seal-receptacle space region are thus at least 75% and at most 125% of the dimensions of the second seal-receptacle space region or vice versa. The transition between the first seal-receptacle space region and the second seal-receptacle space region preferably takes place, when viewed in the radial direction, overlapping with the outer ring, in particular the outer ring end of the outer ring, and/or the outer ring projection.

If the outer ring engages in the seal-receptacle space, this takes place, for example, in such a way that, when viewed in longitudinal section, a larger part of the outer ring or the outer ring projection engages in the second seal-receptacle space region and only a smaller part engages in the first seal-receptacle space region. The different seal-receptacle space widths enable the use of a wheel bearing seal having particularly good sealing action. For example, the wheel bearing seal bears on the wheel flange to form a seal in the first seal-receptacle space and bears on the outer ring to form a seal beyond the first seal-receptacle space region. For example, for this purpose the wheel bearing seal extends through the second seal-receptacle space region in the direction of the outer ring.

One refinement of the invention provides that the wheel bearing seal bears with at least one sealing lip against the wheel flange to form a seal in the first seal receptacle region and extends out of the first seal-receptacle space region into the second seal-receptacle space region and, when viewed in longitudinal section in the radial direction, bears on the outer ring to form a seal overlapping with at least the second seal-receptacle space region. Such a design was already mentioned. It enables the use of a wheel bearing seal having sufficient dimensions to effectuate a reliable seal between the wheel flange and the outer ring.

The wheel bearing seal has the at least one sealing lip, but preferably multiple sealing lips. At least one of the sealing lips, but preferably a plurality of the sealing lips, bear on the wheel flange in the first seal-receptacle space region. At least one other of the sealing lips, but preferably again a plurality of the other sealing lips, bears on the outer ring to form a seal. It can be provided here that, for example, that the wheel bearing seal bears on the outer ring end of the outer ring, in particular on an end face of the outer ring, which is closest to the wheel flange. Additionally or alternatively, it can be provided that the wheel bearing seal at least partially overlaps the outer ring on its radial outer side and bears on the outer circumferential face of the outer ring to form a seal. A particularly good sealing action of the wheel bearing seal is achieved in this way.

One refinement of the invention provides that the seal-receptacle space—when viewed in longitudinal section—is arranged overlapping in the radial direction with an inclined face connecting the wheel bearing face to the brake disc bearing face to form the recess. The recess is thus formed by the inclined face. The inclined face is at least partially or completely in an imaginary plane which is angled with respect to the rotational axis, thus encloses an angle with it which is greater than 0° and less than 180°. For example, the angle is at least 40° and at most 60°.

The inclined face is provided, when viewed in the axial direction, between the wheel bearing face and the brake disc bearing face. It delimits the brake disc receptacle to the inside in the radial direction. The inclined face is preferably aligned in such a way that its distance to the rotational axis decreases extending from the brake disc bearing face toward the wheel bearing face. When viewed in longitudinal section, this inclined face is arranged overlapping with the seal-receptacle space in the radial direction. A design of the wheel flange in longitudinal section is achieved in this way which has the shape of a S or a mirrored S. In other words, the wheel flange, when viewed in longitudinal section, has an S stroke. A compact design of the wheel bearing arrangement is achieved in this way.

One refinement of the invention provides that the seal-receptacle space width is greater than a brake disc receptacle width present in the axial direction between a wheel bearing face and the brake disc bearing face. This in turn enables the use of a wheel bearing seal which reliably seals the wheel bearing in relation to environmental influences. If a good sealing action is not absolutely required, the seal-receptacle space width can thus, of course, also at most correspond to the brake disc receptacle width or can be less than it.

One refinement of the invention provides that the brake disc receptacle width of the brake disc receptacle present in the axial direction between a wheel bearing face and the brake disc bearing face is greater by a factor of at most 1.25 than a wheel bolt receptacle width present between the wheel flange end face and the brake disc bearing face of a wheel bolt receptacle formed in the wheel flange, wherein the brake disc receptacle width corresponds to the wheel bolt width or is less than it. The wheel bearing face is to be understood, as already explained, as the end face of the wheel flange which faces away from the wheel bearing. The brake disc receptacle is provided, when viewed in the axial direction, between the wheel bearing face and the brake disc bearing face. The distance of the wheel bearing face in the axial direction thus corresponds to the brake disc receptacle width.

The at least one wheel bolt receptacle is formed in the wheel flange, which is used to receive a wheel bolt or a wheel screw, by means of which the wheel is fastened during its mounting on the wheel flange. The terms bolt and screw are used basically synonymously in the scope of this application. The wheel bolt receptacle preferably completely penetrates the wheel flange in the axial direction. Furthermore, a longitudinal center axis of the wheel bolt receptacle preferably extends continuously linearly and is in particular aligned parallel to the rotational axis or at least nearly parallel to the rotational axis.

The extension of the wheel bolt receptacle in the axial direction is referred to as the wheel bolt receptacle width. The brake disc receptacle width is particularly preferably less than the wheel bolt receptacle width. However, it is also permissible in principle if the brake disc receptacle width is slightly greater than the wheel bolt receptacle width, namely maximally by a factor of at most 1.25. In this way, reliable fastening of both the brake disc and also the wheel on the wheel flange is implemented.

One refinement of the invention provides that a rim-centering seat formed by the rim-centering seat element has a rim-centering seat width which, when viewed in the axial direction, is present between the wheel bearing face and a rim-centering seat end face facing away from the wheel bearing face and corresponds to at least the brake disc receptacle width and/or at most to the wheel bolt receptacle width. The rim-centering seat present on the rim-centering seat element was already mentioned. The rim-centering seat or the rim-centering seat element has the rim-centering seat width in the axial direction, which extends in just this direction between the wheel bearing face and the rim-centering seat end face. The rim-centering seat end face closes off the rim-centering seat element or the rim-centering seat in the direction facing away from the wheel flange in the axial direction.

To implement reliable centering of the wheel or the rim by the rim-centering seat, it is to be at least larger in the axial direction than the brake disc receptacle. The rim-centering seat width is therefore at least as large as the brake disc receptacle width. To achieve a particularly compact design of the wheel bearing arrangement, however, the rim-centering seat width is preferably restricted to the size of the wheel bolt receptacle width, is thus less than or equal to the wheel bolt receptacle width. Such a design of the wheel bearing arrangement implements the above-mentioned advantages, namely a simple and reliable mounting of the wheel on the wheel flange and a compact design in the axial direction.

One refinement of the invention provides that the rim-centering seat element has a larger internal diameter than the wheel hub. Both the wheel hub and also the rim-centering seat element have a central interior, wherein the interior of the wheel hub merges without interruption into the interior of the rim-centering seat element. However, widening of the interior takes place here, so that the interior of the rim-centering seat element is larger in comparison to the internal diameter of the wheel hub. The respective interior is provided in the form of a cavity. A weight reduction of the wheel bearing arrangement is implemented in this way. For example, the different internal diameters are formed by means of an internal diameter jump. This means that the interior widens suddenly extending from the interior of the wheel hub in the direction of the interior of the rim-centering seat element, namely while forming a step.

BRIEF DESCRIPTION OF THE FIGURE(S)

The invention is explained hereinafter on the basis of the exemplary embodiments illustrated in the drawing, without the invention being restricted.

FIG. 2 shows a schematic longitudinal sectional illustration of another embodiment of a wheel bearing arrangement for a motor vehicle.

DETAILED DESCRIPTION

Figure 1:
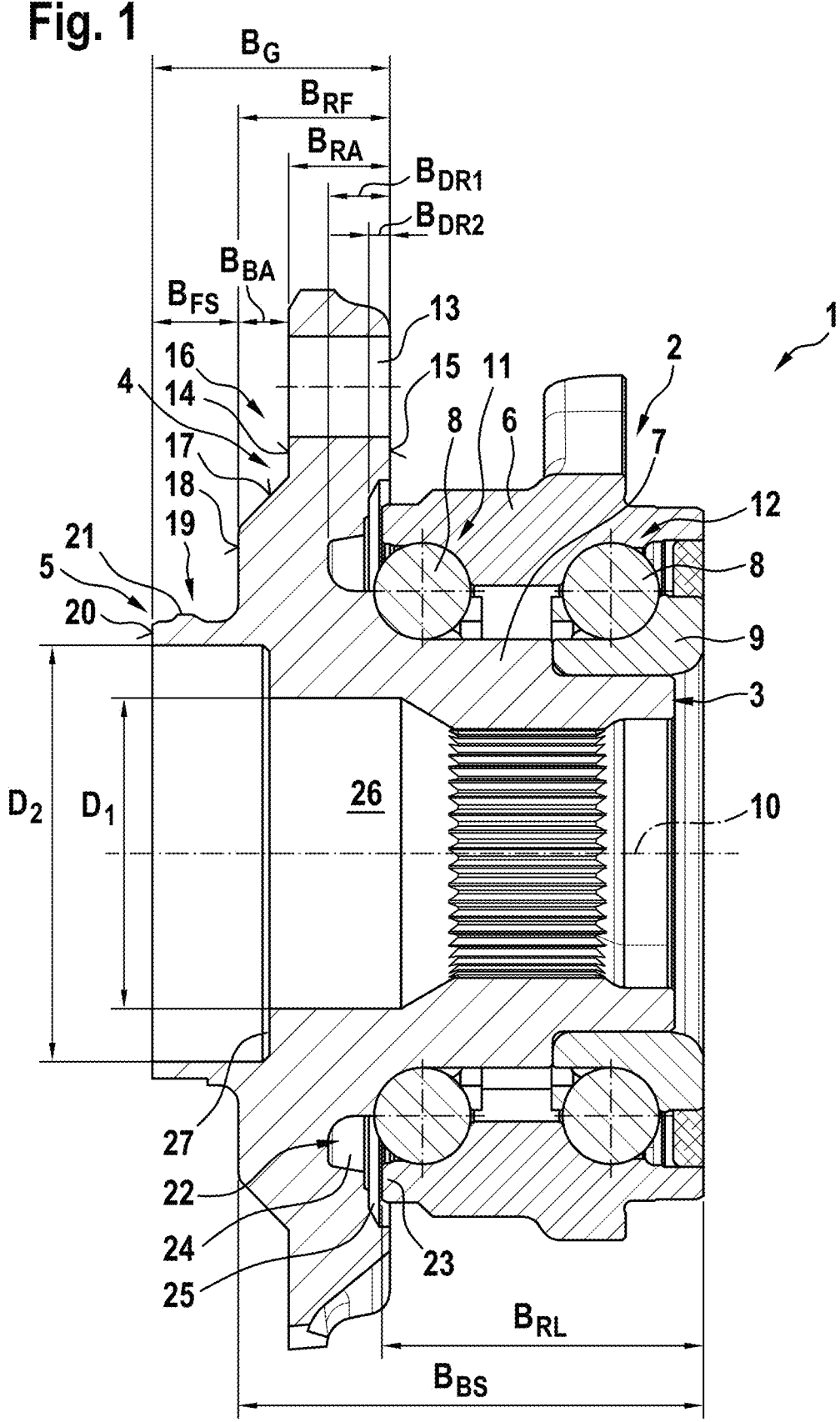
FIG. 1 shows a schematic longitudinal sectional illustration of an embodiment of a wheel bearing arrangement for a motor vehicle.

The figures shows a schematic longitudinal sectional illustration through a region of a wheel bearing arrangement 1 for a motor vehicle. In particular a wheel bearing 2, a wheel hub 3, a wheel flange 4, and a rim-centering seat element 5 are shown of the wheel bearing arrangement 1. The wheel bearing 2 has an outer ring 6 and an inner ring 7. It is designed as a roller bearing, so that roller bodies 8 are arranged between the outer ring 6 and the inner ring 7, which effectuate a friction reduction between the outer ring 6 and the inner ring 7. In the exemplary embodiment shown here, the inner ring 7 of the wheel bearing 2 is formed integrated with the wheel hub 3, so that the wheel hub 3 itself has a running surface for one or more of the roller bodies 8. Of course, however, the inner ring 7 can also be formed separately from the wheel hub 3.

In addition to the inner ring 7, a farther inner ring 9 of the wheel bearing 2 is shown, which also forms a running surface for at least one or more of the roller bodies 8. The inner ring 9 is preferably formed separately from the inner ring 7 or the wheel hub 3. For example, it is arranged after the outer ring 6 and the roller bodies 8 or jointly with them on the inner ring 7 and/or the wheel hub 3. The further inner ring 9 is fixed on the wheel hub 3 in the axial direction, for example, by the formation of a rolling rivet shoulder on the wheel hub. The rolling rivet shoulder is produced by widening the wheel hub 3 in the radial direction.

The inner ring 7 and the wheel hub 3 arranged or fastened thereon are arranged in the outer ring 6. However, the wheel hub 3 protrudes in the axial direction out of this outer ring. At this point, both the wheel flange 4 and also the rim-centering seat element 5 extend from the wheel hub 3, namely the wheel flange 4 in the radial direction outward and the rim-centering seat element 5 in the axial direction in the direction facing away from the wheel bearing 2. The wheel flange 4 runs in the radial direction beyond the roller bodies 8 and the outer ring 6. With the aid of the wheel bearing 2, the wheel hub 3, the wheel flange 4, and the rim-centering seat element 5 are rotatably mounted around a rotational axis 10 with respect to a wheel carrier (not shown here). The wheel bearing 2 is provided as a multirow roller bearing, so that the roller bodies 8 are divided into two roller body rows 11 and 12 spaced apart from one another in the axial direction with respect to the rotational axis 10.

A brake disc (not shown here) and a wheel (also not shown here) of the motor vehicle are fastenable or fastened on the wheel flange 4. The fastening of the wheel on the wheel flange 4 is carried out by means of at least one wheel bolt (not shown), which the wheel flange 4 has a wheel bolt receptacle 13 to receive. The wheel bolt receptacle 13 extends through, on the one hand, a brake disc bearing face 14 and a wheel flange end face 15 facing away from it. The brake disc bearing face 14 delimits a brake disc receptacle 16 in the axial direction, namely in the direction of the wheel bearing 2.

In contrast, the brake disc receptacle 16 is delimited in the radial direction inward by an outer circumferential face 17 of the wheel flange 4, which is formed as an inclined face in the exemplary embodiment shown here. To form the outer circumferential face 17, the wheel hub 3 is thus embodied as conical in regions. The brake disc bearing face 14 is preferably located continuously in an imaginary plane which is preferably perpendicular to the rotational axis 10. The outer circumferential face 17 is preferably also planar when viewed in longitudinal section.

In the axial direction on the side of the brake disc receptacle 16 facing away from the brake disc bearing face 14, the wheel flange 4 has a wheel bearing face 18 on which a wheel of the motor vehicle bears after it is mounted. The wheel bearing face is preferably located continuously in an imaginary plane which furthermore is preferably perpendicular to the rotational axis 10. Overall, the wheel flange 4, when viewed in the axial direction, is delimited, on the one hand, by the wheel flange end face 15 and, on the other hand, by the wheel bearing face 18.

The rim-centering seat element 5 forms a rim-centering seat 19, which extends, when viewed in the axial direction, from the wheel bearing face 18 up to a rim-centering seat end face 20. It can be provided that at least one radial projection 21, which can be formed to be continuous or interrupted in the circumferential direction, extends from the rim-centering seat element 5.

At least one wheel bearing seal (not shown here) is provided to seal off the wheel bearing 2 from external influences. This seal is arranged at least in regions in a seal-receptacle space 22, which is formed in the wheel flange 4. In the exemplary embodiment of the wheel bearing arrangement 1 shown here, the outer ring 6 engages with an outer ring end 23 in the seal-receptacle space 22, so that thus, when viewed in the axial direction, the outer ring 6 and the wheel flange 4 are provided in overlap with one another. A particularly compact design of the wheel bearing arrangement 1 in the axial direction is implemented in this way.

In any case, however, it is provided that the seal-receptacle space 22 overlaps the outer ring 6 or at least its outer ring end 23 in the radial direction to the outside, so that the seal-receptacle space 22 thus extends farther outward in the radial direction than the outer ring 6 or at least the outer ring end 23. This enables at least an extremely close arrangement of the outer ring 6 on the wheel flange 4, so that, for example, the outer ring 6 and the wheel flange 4 terminate flush with one another.

It is recognizable that the seal-receptacle space 22 is formed stepped and thus has a first seal-receptacle space region 24 and a second seal-receptacle space region 25, which are distinguished by different seal-receptacle space widths. The seal-receptacle space width of the first seal-receptacle space region 24 can be identified as first seal-receptacle space width $B_{DR1}$ and the seal-receptacle space width of the second seal-receptacle space region 25 as the second seal-receptacle space width $B_{DR2}$.

As further dimensions, the wheel bolt receptacle 13 has a wheel bolt receptacle width $B_{RA}$, the brake disc receptacle 16 has a brake disc receptacle width $B_{BA}$, and the rim-centering seat 19 has a rim-centering seat width $B_{FS}$. Furthermore, the wheel flange 4 has a wheel flange width $B_{RF}$, which is composed of the wheel bolt receptacle width $B_{RA}$ and the brake disc receptacle width $B_{BA}$. A sum of the wheel flange width $B_{RF}$ and the rim-centering seat width $B_{FS}$ is denoted as the total width $B_G$. Furthermore, a bearing unit width $B_{BS}$ is indicated, which denotes the distance in the axial direction between the brake disc bearing face 14 and an end face of the outer ring 6 facing away from the wheel flange 4. The extension of the outer ring 6 in the axial direction is denoted as the outer ring width $B_{RL}$.

It is furthermore recognizable that the wheel hub 3 and the rim-centering seat element 5 have a common interior 26, which has an internal diameter $D_1$ in the region of the wheel hub 3 and an internal diameter $D_2$ in the region of the rim-centering seat element 5. In this case, the diameter $D_2$ is greater than the diameter $D_1$. The widening of the interior 6 starting from the wheel hub 3 toward the rim-centering seat element 5 is preferably effectuated by an internal diameter jump 27, by which a step 27 is formed. The interior 26 is thus provided as a stepped interior.

The described design of the wheel bearing arrangement 1 is distinguished, on the one hand, by simple mounting of the wheel, namely due to the rim-centering seat element 5 or the rim-centering seat 19. On the other hand, it has an extremely compact structure in the axial direction.

LIST OF REFERENCE SIGNS 1 wheel bearing arrangement
2 wheel bearing
3 wheel hub
4 wheel flange
5 rim-centering seat element
6 outer ring
7 inner ring
8 roller body
9 inner ring
10 rotational axis
11 roller body row
12 roller body row
13 wheel bolt receptacle
14 brake disc bearing face
15 wheel flange end face
16 brake disc receptacle
17 outer circumferential surface
18 wheel bearing face
19 rim-centering seat
20 rim-centering seat end face
21 radial projection
22 seal-receptacle space
23 outer ring end
24 first seal-receptacle space region
24 second seal-receptacle space region
26 interior
27 step

The invention claimed is:

1. A wheel bearing arrangement for a motor vehicle, comprising: a wheel hub and a wheel bearing for rotatably mounting the wheel hub on a wheel carrier, wherein the wheel bearing has an outer ring and an inner ring which can rotate with respect to the outer ring about a rotational axis, wherein the inner ring is connected to the wheel hub, wherein a wheel flange extends from the wheel hub in a radial direction and has a brake disc receptacle which, when viewed in the axial direction, is open in the direction facing away from the outer ring and is formed, when viewed in a longitudinal section, by a recess in the wheel flange and has a brake disc bearing face for a brake disc, wherein the wheel flange has a wheel flange end face on a side facing the outer ring in an axial direction, wherein a wheel bolt receptacle is present between the brake disc bearing face and the wheel flange end face, wherein the wheel flange end face is flush with an end of the wheel bolt receptacle in the axial direction, wherein a seal-receptacle space is formed in the wheel flange on the side facing the outer ring in the axial direction, wherein a rim-centering seat element extends from the wheel hub and runs in the direction opposite the brake disc bearing face with respect to the brake disc receptacle, wherein the wheel flange end face overlaps, in the axial direction, with an outer ring end of the outer ring facing the wheel flange.

2. The wheel bearing arrangement as claimed in claim 1, wherein the rim-centering seat element has a larger internal diameter than the wheel hub.

3. A wheel bearing arrangement for a motor vehicle, comprising: a wheel hub and a wheel bearing for rotatably mounting the wheel hub on a wheel carrier, wherein the wheel bearing has an outer ring and an inner ring which can rotate with respect to the outer ring about a rotational axis, wherein the inner ring is connected to the wheel hub, wherein a wheel flange extends from the wheel hub in a radial direction and has a brake disc receptacle which, when viewed in the axial direction, is open in the direction facing away from the outer ring and is formed, when viewed in a longitudinal section, by a recess in the wheel flange and has a brake disc bearing face for a brake disc, wherein a seal-receptacle space is formed in the wheel flange on a side facing the outer ring in an axial direction, wherein a rim-centering seat element extends from the wheel hub and runs in the direction opposite the brake disc bearing face with respect to the brake disc receptacle, wherein the outer ring of the wheel bearing terminates flush with a wheel flange end face of the wheel flange facing the outer ring.

4. The wheel bearing arrangement as claimed in claim 3, wherein the seal-receptacle space, when viewed in the longitudinal section, is arranged overlapping in the radial direction with an inclined face connecting a wheel bearing face to the brake disc bearing face to form the recess.

5. The wheel bearing arrangement as claimed in claim 4, wherein the rim-centering seat element has a larger internal diameter than the wheel hub.

6. The wheel bearing arrangement as claimed in claim 3, wherein the seal-receptacle space, when viewed in the longitudinal section, has a first seal-receptacle space region having a first seal-receptacle space width and a second seal-receptacle space region having a second seal-receptacle space width different from the first seal-receptacle space width, wherein the first seal-receptacle space region, when viewed in the radial direction, merges into the second seal-receptacle space region overlapping the outer ring.

7. The wheel bearing arrangement as claimed in claim 3, wherein the rim-centering seat element has a larger internal diameter than the wheel hub.

8. A wheel bearing arrangement for a motor vehicle, comprising: a wheel hub and a wheel bearing for rotatably mounting the wheel hub on a wheel carrier, wherein the wheel bearing has an outer ring and an inner ring which can rotate with respect to the outer ring about a rotational axis, wherein the inner ring is connected to the wheel hub, wherein a wheel flange extends from the wheel hub in a radial direction and has a brake disc receptacle which, when viewed in the axial direction, is open in the direction facing away from the outer ring and is formed, when viewed in a longitudinal section, by a recess in the wheel flange and has a brake disc bearing face for a brake disc, wherein a seal-receptacle space is formed in the wheel flange on a side facing the outer ring in an axial direction, wherein a rim-centering seat element extends from the wheel hub and runs in the direction opposite the brake disc bearing face with respect to the brake disc receptacle, wherein the seal-receptacle space, when viewed in the longitudinal section, has a first seal-receptacle space region having a first seal-receptacle space width and a second seal-receptacle space region having a second seal-receptacle space width different from the first seal-receptacle space width, wherein the first seal-receptacle space region, when viewed in the radial direction, merges into the second seal-receptacle space region overlapping the outer ring.

9. The wheel bearing arrangement as claimed in claim 8, wherein the seal-receptacle space width is greater than a brake disc receptacle width present in the axial direction between a wheel bearing face and the brake disc bearing face.

10. The wheel bearing arrangement as claimed in claim 9, wherein the brake disc receptacle width of the brake disc receptacle is greater by a factor of at most 1.25 than a wheel bolt receptacle width present between the wheel flange end face and the brake disc bearing face of a wheel bolt receptacle formed in the wheel flange, or in that the brake disc receptacle width corresponds to the wheel bolt receptacle width or is less than the wheel bolt receptacle width.

11. The wheel bearing arrangement as claimed in claim 9, wherein the rim-centering seat element has a larger internal diameter than the wheel hub.

12. The wheel bearing arrangement as claimed in claim 9, a rim-centering seat formed by the rim-centering seat element has a rim-centering seat width, which is present, when viewed in the axial direction, between the wheel bearing face and a rim-centering end face facing away from the wheel bearing face and corresponds to at least the brake disc receptacle width and/or at most the wheel bolt receptacle width.

13. The wheel bearing arrangement as claimed in claim 10, wherein the rim-centering seat element has a larger internal diameter than the wheel hub.

14. The wheel bearing arrangement as claimed in claim 8, wherein the rim-centering seat element has a larger internal diameter than the wheel hub.

\* \* \* \* \*